United States Patent

McCarthy et al.

(10) Patent No.: US 6,839,613 B2
(45) Date of Patent: Jan. 4, 2005

(54) REMOTE TUNING FOR GAS TURBINES

(75) Inventors: John Patrick McCarthy, Rochester, NY (US); Andrew Philip Shapiro, Schenectady, NY (US); George Edward Williams, Niskayuna, NY (US); Eric Gardner Butterfield, Watervliet, NY (US); Scott Campbell Mattison, Salem, VA (US); Victor Franz Russo, Woodstock, GA (US); Milton Lewiston Grant, III, Washington, DC (US)

(73) Assignee: General Electric Company, Schenectady, NY (US)

(*) Notice: Subject to any disclaimer, the term of this patent is extended or adjusted under 35 U.S.C. 154(b) by 424 days.

(21) Appl. No.: 09/906,001

(22) Filed: Jul. 17, 2001

(65) Prior Publication Data

US 2003/0018394 A1 Jan. 23, 2003

(51) Int. Cl.⁷ ............................................. G05D 11/00
(52) U.S. Cl. ..................... 700/287; 60/39.281; 60/773; 60/776
(58) Field of Search ................................ 700/287, 288, 700/286, 290; 60/39.27, 39.281, 725, 773; 431/114

(56) References Cited

U.S. PATENT DOCUMENTS

| | | |
|---|---|---|
| 4,787,053 A | 11/1988 | Moore |
| 4,803,639 A | 2/1989 | Steele et al. |
| 4,843,557 A | 6/1989 | Ina et al. |
| 4,992,946 A | 2/1991 | Butz et al. |
| 5,211,004 A | 5/1993 | Black |
| 5,319,931 A | 6/1994 | Beebe et al. |
| 5,411,712 A | 5/1995 | Woodmansee et al. |
| 5,423,175 A | 6/1995 | Beebe et al. |
| 5,487,265 A | 1/1996 | Rajamani et al. |
| 5,487,266 A | 1/1996 | Brown |
| 5,487,275 A | 1/1996 | Borkowicz et al. |
| 5,488,784 A | 2/1996 | Woodmansee et al. |
| 5,489,738 A | 2/1996 | Abramowicz et al. |
| 5,491,970 A | 2/1996 | Davis, Jr. et al. |
| 5,544,478 A | 8/1996 | Shu et al. |
| 5,551,228 A * | 9/1996 | Mick et al. .................... 60/776 |
| 5,608,627 A | 3/1997 | Lecomte et al. |

(List continued on next page.)

FOREIGN PATENT DOCUMENTS

| | | |
|---|---|---|
| EP | 1 168 121 | 1/2002 |
| EP | 1 168 130 | 1/2002 |

OTHER PUBLICATIONS

Patent Abstracts of Japan, Kenichi, Publication No. 11202931, Publication Date Jul. 30, 1999, Plant Operation Monitoring and Operating Device, 1 page.

Patent Abstracts of Japan, Hiroshi, Publication No. 2002138895, Publication Date May 17, 2002, Internal Combustion Engine Control Device and Data Communication System Using Internal Combustion Engine Control Device, 1 page.

*Primary Examiner*—Leo Picard
*Assistant Examiner*—Charles R Kasenge
(74) *Attorney, Agent, or Firm*—Nixon & Vanderhye P.C.

(57) ABSTRACT

A system and method for tuning a turbine comprises a turbine controller coupled to the turbine, a first computer system coupled to the turbine controller and located locally to the turbine, and a second computer system for exchanging data with the first computer system. The second computer system is located remotely from the turbine and exchanges data with the first computer system via a network connection such as the internet, an intranet or a virtual private network (VPN). Data relating to a characteristic such as turbine combustion dynamics and/or emissions is transmitted by the first computer system to the second computer system. The second computer system transmits control data over the network connection to the first computer to tune the turbine.

22 Claims, 6 Drawing Sheets

U.S. PATENT DOCUMENTS

| | | | |
|---|---|---|---|
| 5,636,507 | A | 6/1997 | Rajamani et al. |
| 5,661,969 | A | 9/1997 | Beebe et al. |
| 5,706,896 | A | 1/1998 | Tubel et al. |
| 5,729,968 | A | 3/1998 | Cohen et al. |
| 5,937,634 | A | 8/1999 | Etheridge et al. |
| 5,975,204 | A | 11/1999 | Tubel et al. |
| 6,073,479 | A | 6/2000 | Shapiro et al. |
| 6,082,092 | A | 7/2000 | Vandervort |
| 6,110,321 | A | 8/2000 | Day et al. |
| 6,155,098 | A | 12/2000 | Shapiro et al. |
| 6,197,187 | B1 | 3/2001 | Thornton et al. |
| 6,205,765 | B1 | 3/2001 | Iasillo et al. |
| 6,250,063 | B1 | 6/2001 | Davis, Jr. et al. |
| 6,255,551 | B1 | 7/2001 | Shapiro et al. |
| 6,260,004 | B1 | 7/2001 | Hays et al. |
| 6,269,299 | B1 | 7/2001 | Blotenberg |
| 6,354,071 | B2 | 3/2002 | Tegel et al. |
| 6,499,114 | B1 | 12/2002 | Almstead et al. |
| 6,584,434 | B1 | 6/2003 | Schick et al. |
| 6,591,296 | B1 | 7/2003 | Ghanime |
| 2002/0029097 | A1 * | 3/2002 | Pionzio et al. .............. 700/287 |
| 2004/0128146 | A1 | 7/2004 | Williams et al. |

* cited by examiner

REMOTE TUNING FOR GAS TURBINES

BACKGROUND OF THE INVENTION

The present invention relates to a system and method for tuning a gas turbine, and in particular, to a system and method for tuning a gas turbine from a remote computer.

FIG. 1 schematically illustrates a conventional gas turbine system. The system includes a gas turbine 100 having, inter alia, a plurality of combustion chambers 101, a plurality of pressure transducers 103a, 103b installed in respective combustion chambers 101 for measuring pressure therein, an emission sensor 107 installed in each of the combustion chambers 101 for measuring emissions therein, and a fuel manifold (not shown) for controlling and providing fuel splits to the turbine 100.

A tuning kit 130 including a signal conditioner 133 and a dynamics monitor 135 is operatively coupled to the gas turbine 100. Specifically, the signal conditioner 133 is connected through a coaxial cable 131 to the pressure transducers 103a, 103b for receiving raw data signals from the pressure transducers 103a, 103b. The signal conditioner 133 processes the received raw data signals by providing an analog to digital conversion to the raw data and outputs corresponding signals to the combustion dynamics monitor 135. The combustion dynamics monitor 135 includes a computer that provides further signal processing to the received signals and ultimately generates a fast fourier transform (FFT) from which maximum amplitudes and frequencies of the combustion dynamics of the turbine 100 can be determined.

An emissions system 104 is connected to the emissions sensors 107 (one shown) to provide data regarding the amount of substances such as $NO_X$ and CO in the exhaust of the turbine 100. An on-site engineer can analyze the amplitude and frequency data generated by the combustion dynamics monitor 135 and/or emissions system 104 and determine any necessary adjustments to the gas turbine 100 such as an adjustment to the fuel split settings.

A turbine controller 110 such as a Mark V turbine controller is operatively connected to the turbine 100. A processor such as an "I" processor 140 is connected to the turbine controller 110 for exchanging data using Arcnet protocol. After the engineer determines the necessary changes to the gas turbine 100, the engineer can provide an input into the processor 140 such as new fuel split control values to implement the changes. The processor 140 provides the control values to the turbine controller 110 which, in turn, provides a corresponding signal to the turbine 100 so that the turbine 100 can be tuned to the new settings reflecting the input into the processor 140.

After the gas turbine 100 has adjusted to the new settings, the engineer will make another set of measurements through the pressure transducers 103a, 103b and/or emissions sensors 107 to thus obtain another measurement of the combustion dynamics and/or emissions of the turbine 100. This process is repeated until a map of combustion dynamics and/or emissions as a function of fuel splits and operating mode is developed. Using this map, the engineer can determine the optimum fuel split settings to achieve low emissions and low dynamics.

The conventional gas turbines require tuning to minimize combustion dynamics and emissions. This tuning is performed locally. The engineer must therefore be present on-site at the location of the turbine to tune the turbine. Often, the engineer must wait around for other subsystems to become ready to tune the turbine.

It would thus be beneficial to enable the engineer to tune a turbine from a remote location, thereby resulting in improved productivity.

BRIEF SUMMARY OF THE INVENTION

In an exemplary embodiment of the invention, a system for tuning a turbine comprises a turbine controller operatively coupled to the turbine, a first computer system operatively coupled to the turbine controller and located locally to the turbine, and a second computer system for exchanging data with the first computer system that is located remotely from the turbine. The first computer system and the second computer system exchange data over a network connection such as an intranet, the internet or a virtual private network. The first computer system comprises an on-site monitor and the second computer system comprises a local area network having a workstation, and the first computer system is capable of exchanging data with the workstation via the on-site monitor. The on-site monitor exchanges data with the turbine controller using a first protocol and exchanges data with the second computer system using a second protocol different than the first protocol. The first computer system is capable of transmitting data relating to a characteristic of the turbine to the second computer system such as combustion dynamics and/or emissions of the turbine. The second computer system is capable of receiving input from a system user and transmitting control data relating to turbine fuel splits and reflecting the input from the system user to the first computer system. The first computer system is capable of providing the control data to the turbine controller to tune the turbine in accordance with control data.

In another exemplary embodiment of the invention, a method of tuning a turbine comprises providing a turbine controller that is operatively coupled to the turbine, operatively coupling a first computer system to the turbine controller and locating the first computer system locally to the turbine, and exchanging data between the first computer system and a second computer system that is located remotely from the turbine to enable the turbine to be tuned. The data exchange between the first computer system and the second computer system is accomplished over a network connection such as an intranet, the internet or a virtual private network. The first computer system exchanges data with the turbine controller using a first protocol and exchanges data with the second computer system using a second protocol different than the first protocol. The method further comprises transmitting data relating to a characteristic of the turbine such as combustion dynamics and/or emissions from the first computer system to the second computer system. The method further comprises transmitting control data from the second computer system to the first computer system, the control data reflecting input to the second computer system from a system user, and providing the control data received by the first computer system to the turbine controller to tune the turbine in accordance with the control data. In an exemplary embodiment, the control data relates to setting fuel splits of the turbine.

By enabling the engineer to tune the turbine from a remote location, the present invention provides a significant improvement in productivity. For example, the same engineer could tune differently located turbines from a single point in an automated fashion and the frequency of tunings can be increased. Furthermore, long term monitoring of a turbine can be enhanced.

In yet another exemplary embodiment of the invention, a system comprises a first turbine, a first turbine controller operatively coupled to the first turbine for transmitting data relating to a characteristic such as combustion dynamics and/or emissions of the first turbine to a remote location over a network connection. The system further comprises a second computer system located at the remote location from the turbine for receiving data transmitted from the first computer system over the network connection. The network connection comprises an intranet, the internet or a virtual private network. The system further comprises a second turbine and a second turbine controller operatively coupled to the second turbine and to the first computer system.

In yet another exemplary embodiment of the invention, a method of tuning a turbine comprises providing a first turbine, operatively coupling a first turbine controller to the first turbine, transmitting data relating to a characteristic such as combustion dynamics and/or emissions of the first turbine to a location remote from the first turbine over a network connection. The network connection comprises an intranet, the internet or a virtual private network. The first turbine specifically transmits the data to a second computer system located remotely from the turbine so that an evaluation of the transmitted data can be made and any necessary changes to the turbine can be communicated (e.g., by telephone) to a person on-site of the turbine. The method further comprises providing a second turbine, operatively coupling a second turbine controller to the second turbine, transmitting data relating to a characteristic of the second turbine to the location remote from the first turbine over the network connection, the location remote from the first turbine also being remote from the second turbine. Multiple turbines at one location can therefore be controlled by a remote engineer.

In yet another exemplary embodiment of the present invention, a system comprises a first turbine, a first turbine controller operatively coupled to the first turbine, a first computer system operatively coupled to the first turbine controller and located locally to the first turbine, a second turbine, a second turbine controller operatively coupled to the second turbine, a second computer system operatively coupled to the second turbine controller and located locally to the second turbine, and a third computer system for exchanging data with the first computer system and the second computer system. The third computer system is located remotely from the first and second turbines and the first and second turbines are located remotely from each other. The third computer system exchanges data with the first computer system and the second computer system via a network connection such as an intranet, an internet or a virtual private network. The first computer system is capable of transmitting data relating to combustion dynamics and/or emissions of the first turbine to the third computer system and the second computer system is capable of transmitting data relating to combustion dynamics and/or emissions of the second turbine to the third computer system. The third computer system is capable of receiving the inputs from a system user and transmitting control data to the first computer system and the second computer system reflecting the inputs from the system user. The first computer system is capable of providing control data to the first turbine controller to tune the first turbine accordingly, and the second computer system is capable of providing control data to the second turbine controller to tune the second turbine accordingly. The control data transmitted from the third computer system to the first computer system relates to setting fuel splits of the first turbine and the control data transmitted from the third computer system to the second computer system relates to setting fuel splits of the second turbine.

BRIEF DESCRIPTION OF THE DRAWINGS

These, as well as other advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
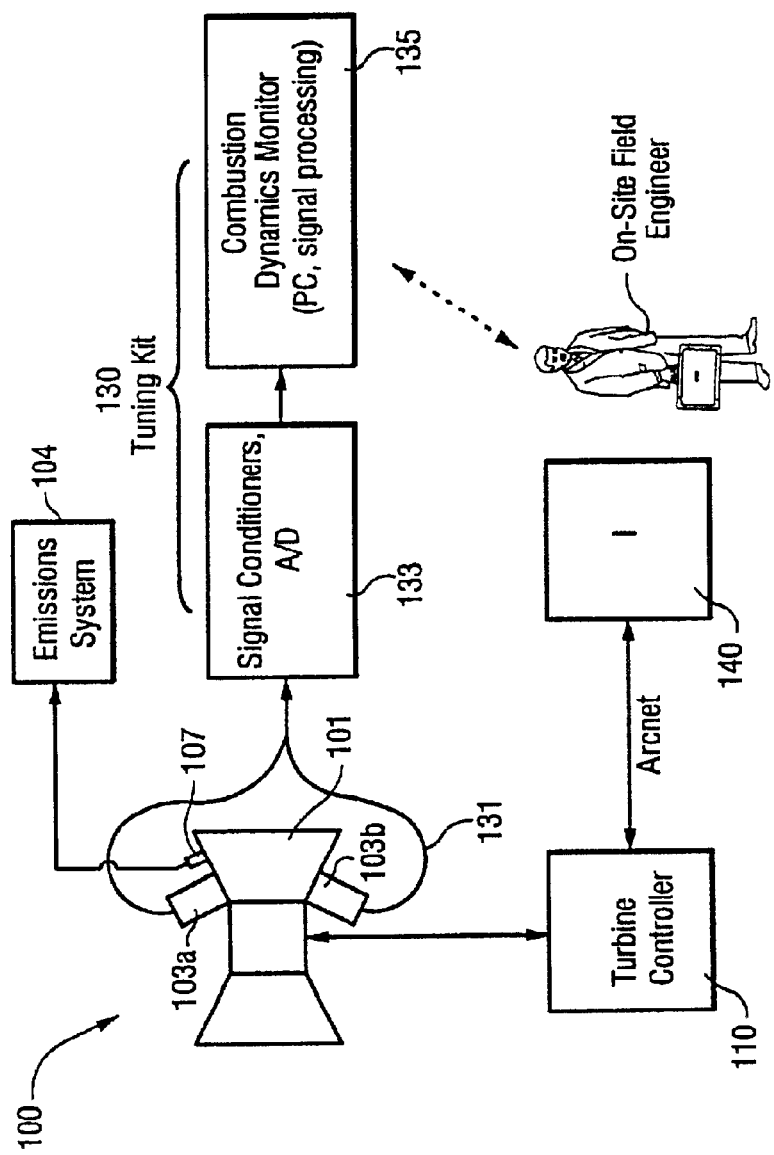
FIG. 1 is a schematic diagram illustrating a conventional gas turbine system.
Figure 2:
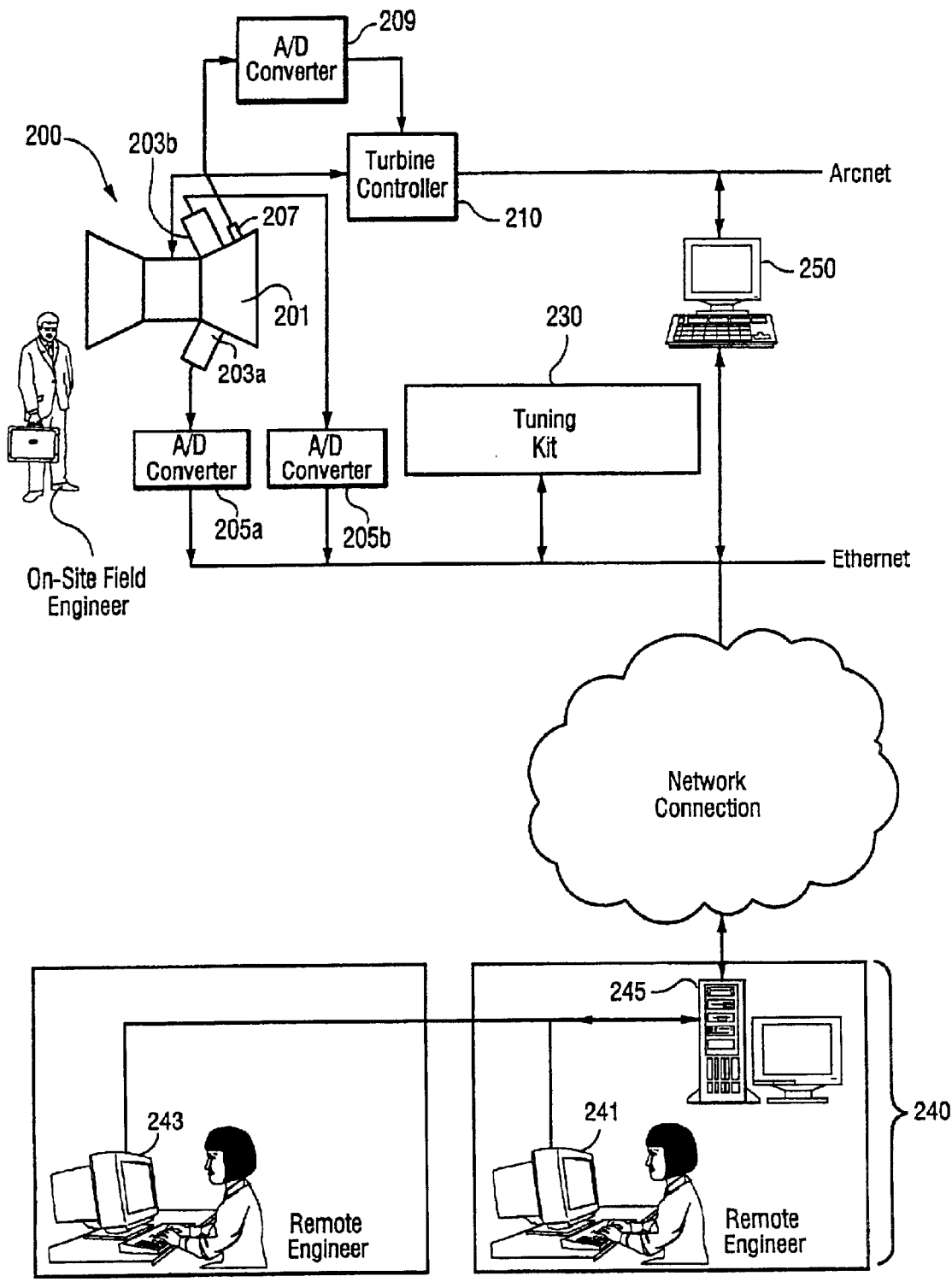
FIG. 2 is a schematic diagram illustrating a gas turbine system that is operatively connected to and exchanges data with a remote computer system according to an exemplary embodiment of the present invention.

FIG. 2 illustrates an exemplary embodiment of a remotely tuned gas turbine system in accordance with the present invention. The system includes a gas turbine 200 having a plurality of combustion chambers 201, pressure transducers 203a, 203b respectively installed in the combustion chambers 201, an emissions sensor 207 installed in each of the combustion chambers 201 and a fuel manifold (not shown). The pressure transducers 203a, 203b measure the pressure within each of combustion chambers of the turbine 200 and thus provide a measure of the combustion dynamics of the turbine 200. The emission sensors 207 (one shown) measure the amount of substances such as $NO_X$ and CO in the exhaust of the combustion chambers 201 of the gas turbine 200. The fuel manifold enables the distribution of the fuel provided to the turbine 200 to be split in a controlled manner.

The system further includes analog to digital A/D converters 205a, 205b, 209, a tuning kit 230, an on-site monitor (OSM) 250, and a turbine controller 210. The A/D converters 205a, 205b, 209, the tuning kit 230, the OSM 250 and the turbine controller 210 effectively form a computer system that is located locally to the turbine 200. The A/D converters 205a, 205b, the tuning kit 230 and the OSM 250 operatively communicate (i.e., exchange data) with each other using a shared protocol (e.g., an Ethernet protocol). The OSM 250 and the turbine controller 210 communicate with each other using the same or a different protocol (e.g., an Arcnet protocol).

The A/D converters 205a and 205b are connected to the pressure transducers 203a and 203b, respectively, to receive the analog signals reflecting the raw data measurements of the pressure transducers 203a, 203b and to convert the analog signals into digital data. The tuning kit 230 runs a computer program that collects the digital data from the A/D converters 205a, 205b. The program run by the tuning kit 230 also performs signal processing on the digital data and generates a FFT having amplitude and frequency data from which maximum amplitudes and frequencies of combustion dynamics can be determined.

A/D converters 209 (one shown) are connected to emissions sensors 207, respectively, to receive the analog signals reflecting the raw data measurements of the emissions sensors 207 and to convert the analog signals into digital data. The digital data from the A/D converters 209 is provided to the turbine controller 210. The turbine controller 210 forwards corresponding data relating to the measurements by the emissions sensors 207 to the OSM 250 using an Arcnet protocol.

The remotely tuned turbine system also includes a remote network 240 which is remotely located from the gas turbine 200. The network 240 may be formed by, for example, a local area network (LAN) or a wide area network (WAN). The gas turbine 200 and the remote network 240 can be located in different cities. In the exemplary embodiments discussed below, the network 240 is formed by a LAN 240, although those skilled in the art will appreciate that other remote networks such as a WAN may be implemented. The LAN 240 includes a server 245 that is operatively connected to a plurality of workstations 241, 243 which also may be located remotely from each other such as in different cities. The LAN 240 is capable of communicating with the OSM 250 over a network connection such as the internet, an intranet or a virtual private network (VPN). Specifically, data can be exchanged with the locally located OSM 250 and the remotely located server 245 of the LAN 240. The server 245 in turn exchanges data with at least one of the workstations 241, 243. The OSM 250 thus serves as a hub that allows the remotely located workstations 241, 243 to communicate with the computer system that is locally located to the turbine 200 through the server 245 and the network connection.

After the tuning kit 230 has generated the frequency and amplitude data, the tuning kit 230 provides this processed data to the OSM 250 using an Ethernet protocol. The OSM 250 then transmits the data over the network connection to the server 245. Additionally (or in the alternative), data relating to the measurements of the emission sensors 207 is provided from the turbine controller 210 to the OSM 250 using an Arcnet protocol. The OSM 250 then transmits the data over the network connection to the server 245 using an Ethernet protocol. The server 245 provides this data it has received to one or more of the workstations 241, 243 so that a system user (e.g., an engineer at workstation 241 or 243 as illustrated in FIG. 2) can interpret the data. The user can determine whether any necessary changes, such as adjustments to the fuel splits provided by the fuel manifold of the turbine system, that need to be made to the turbine to improve its performance.

If the system user determines that changes need to be made to the turbine 200, the system user can input these changes into one of the workstations 241, 243. Control data reflecting these changes, such as fuel split control data, is transmitted from one of the workstations 241 or 243 by a computer program running on the workstations 241, 243 to the server 245. This data is then transmitted over the network connection to the OSM 250. The input provided into one of the workstations 241 or 243 is displayed on the other workstations 243 or 241 of the LAN 240 so that other system users can be informed of the input.

The OSM 250 runs a program that sends the control data to the turbine controller 210 using an Arcnet protocol. The program run by the OSM 250 also ensures the remote workstations 241, 243 are operatively connected thereto. The turbine controller 210, preferably a Mark V turbine controller, is connected to and exchanges data with the turbine 200. After the turbine controller 210 receives the control data from the OSM 250, it sends corresponding signals to the turbine 200 to tune the settings of the turbine. For example, the turbine controller 210 can transmit signals reflecting new fuel split settings in accordance with the input provided by the system user at one of the remote workstations 241, 243. An engineer located on-site of the turbine 200 can verify proper operation of the turbine system.

After the turbine 200 adjusts to the new settings dictated by the turbine controller 210, another set of pressure measurements and/or emissions measurements can be made by the pressure transducer 203a, 203b and/or emissions sensor 207 to determine the combustion dynamics and/or emissions of the turbine 200. In the same manner discussed above, the data relating to these measurements can be transmitted by the OSM 250 over the network connection to the remotely located LAN 240. Further evaluation of the results by the system user and subsequent tuning of the turbine as discussed above is repeated until a map of combustion dynamics and/or emissions as a function of fuel splits is developed. From this map, the optimum fuel split settings can be determined so that the lowest emissions and lowest combustion dynamics can be attained.

The present invention thus enables a remotely located system user to tune a turbine. Significant improvements in the user's productivity can be obtained, for example, by eliminating the need for the user to travel to the turbine site.

Figure 3:
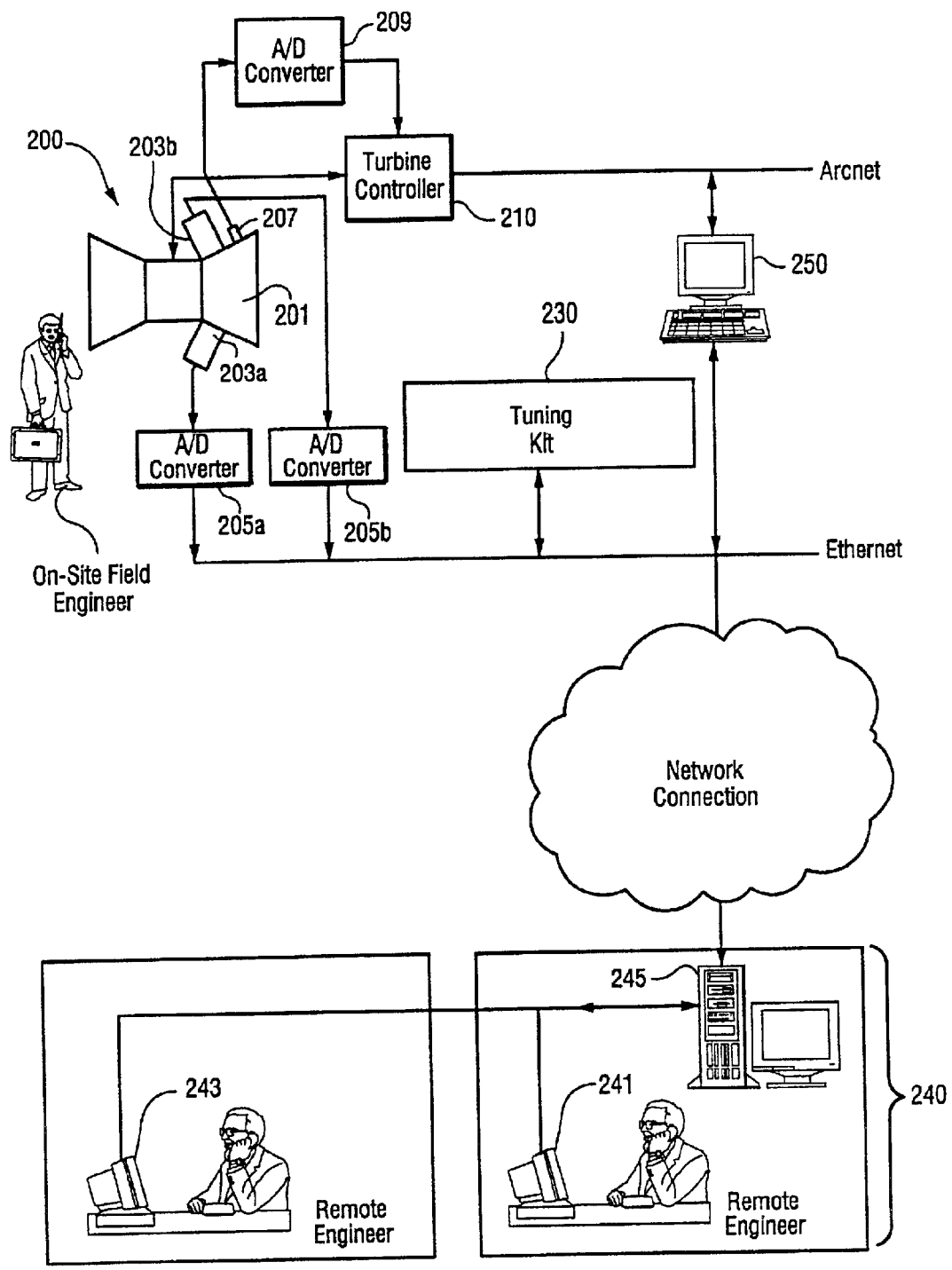
FIG. 3 is a schematic diagram illustrating a gas turbine system that is operatively connected with and transmits data to a remote computer system according to another exemplary embodiment of the present invention.

FIG. 3 illustrates another exemplary embodiment of a gas turbine system that is operatively connected to a remotely located LAN 240. In this and all following embodiments, reference numbers corresponding to parts described in previous embodiments shall remain the same. Only the differences from the previous embodiment(s) shall be discussed in detail.

In the exemplary embodiment illustrated in FIG. 3, data relating to combustion dynamics and/or emissions of the gas turbine 200 are transmitted over the network connection to the LAN 240 as discussed above. However, after a system user (e.g., a remotely located engineer) has evaluated the data transmitted to the LAN 240 at one of the workstations 241, 243, the system user will communicate, preferably by telephone, any necessary changes to an engineer who is located on-site of the gas turbine 200. As discussed above, these changes can include, for example, adjustments to the fuel split settings of the turbine 200. The on-site engineer will locally perform any necessary tuning in accordance with the instructions communicated by the remote system user. There is thus no need to transmit control data relating to any necessary changes to the turbine over the network connection from the LAN 240 to the OSM 250.

Figure 4:
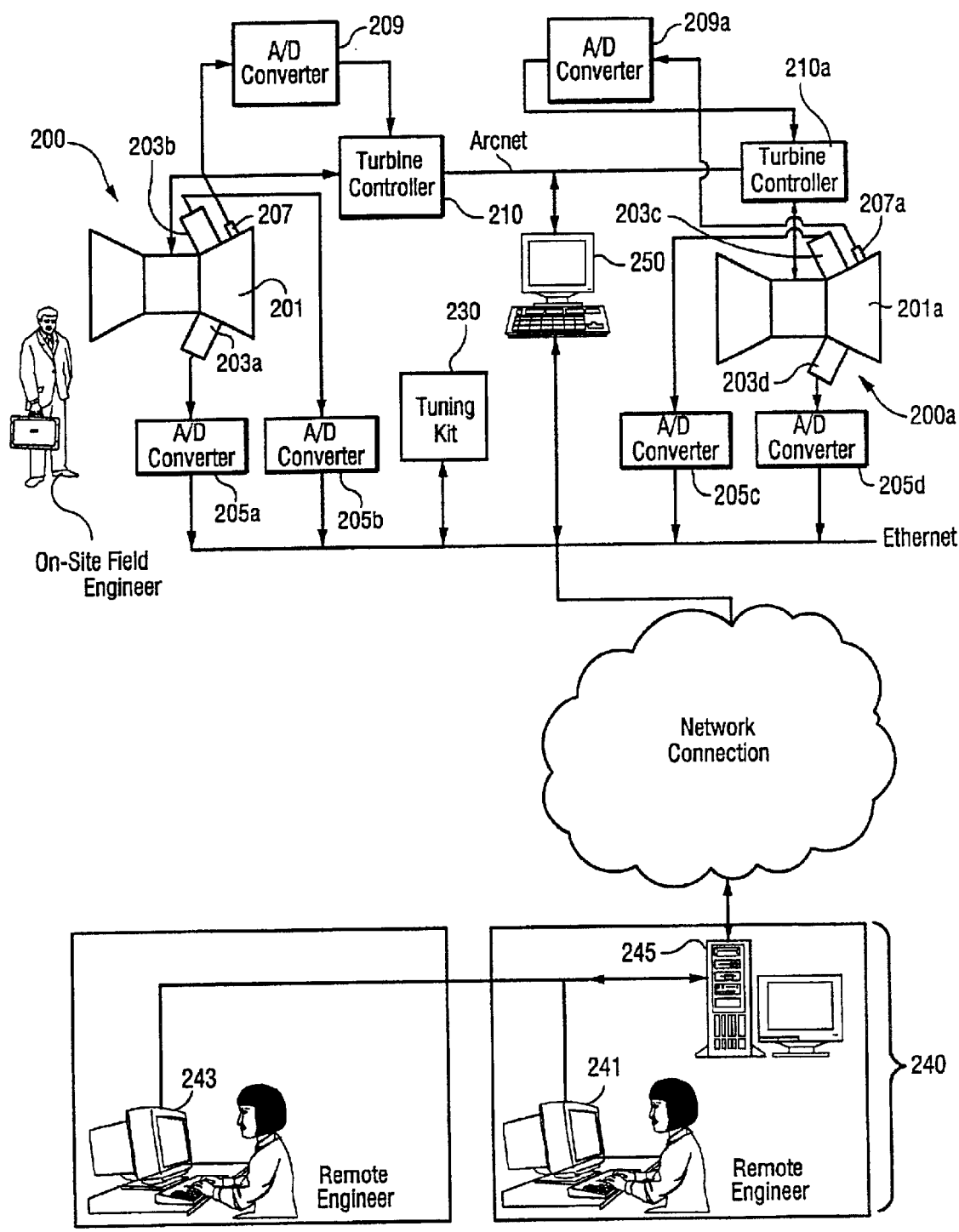
FIG. 4 is a schematic diagram illustrating a gas turbine system having multiple turbines operatively coupled to a local computer system that is operatively connected to a remote computer system according to another exemplary embodiment of the present invention.

FIG. 4 illustrates a gas turbine system having multiple (e.g., two) turbines connected to a computer network that is located locally to the turbines according to another exemplary embodiment of the present invention. Specifically, the turbine system illustrated in FIG. 4 includes all of the components of the turbine system illustrated in FIG. 2. However, the gas turbine system further includes a second gas turbine 200a having a plurality of combustion chambers 201a, a plurality of pressure transducers 203c, 203d respectively installed in the combustion chambers 201a, emissions sensors 207a (one shown) respectfully installed in the combustion chambers 201a and a fuel manifold (not shown). The pressure transducers 203c, 203d are respectively connected to A/D converters 205c, 205d. A/D converters 209a (one shown) are respectively connected to the emissions sensors 207a. The output of the A/D converters 209a are provided to turbine controller 210a which exchanges data with OSM 250 using an Arcnet protocol.

The structure and operation of gas turbine 200a and its operatively connected components are similar to gas turbine 200 and its corresponding operatively connected components. As illustrated in FIG. 4, both of the turbines 200, 200a are operatively connected to the same tuning kit 230 and OSM 250. The OSM can thus exchange data with the LAN 240 over the network connection to tune both turbines 200, 200a. The turbine 200 and 200a are located locally to each other and are located remotely from the LAN 240.

As will be appreciated by those skilled in the art, the system disclosed in FIG. 4 can be modified in accordance with the embodiment of FIG. 3. That is, the system illustrated in FIG. 4 can be modified so that a system user at one of the remote workstations 241 or 243 can evaluate data received over the network connection from the turbines 200, 200a and communicate instructions to (e.g., by telephone) an on-site engineer to perform local tuning of the turbines 200, 200a.

Figure 5A:
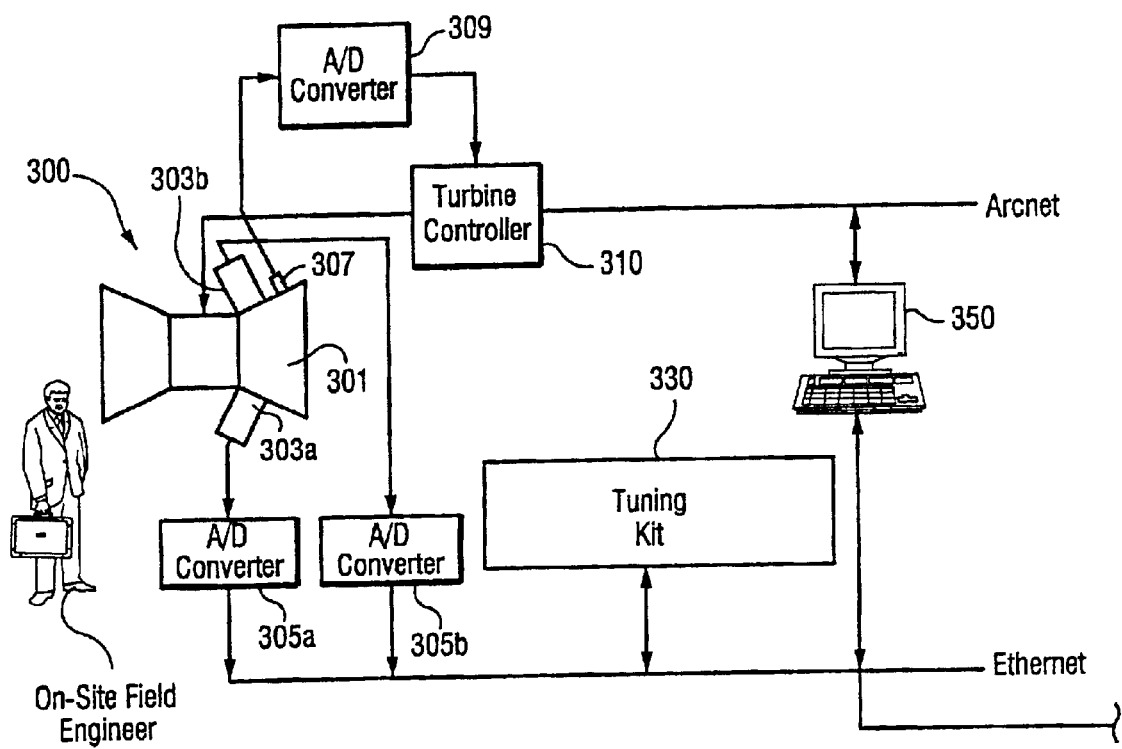
FIGS. 5A and 5B form a schematic diagram illustrating multiple gas turbine systems that are remote from each other and are operatively connected to a remote computer system according to another exemplary embodiment of the present invention.
Figure 5B:
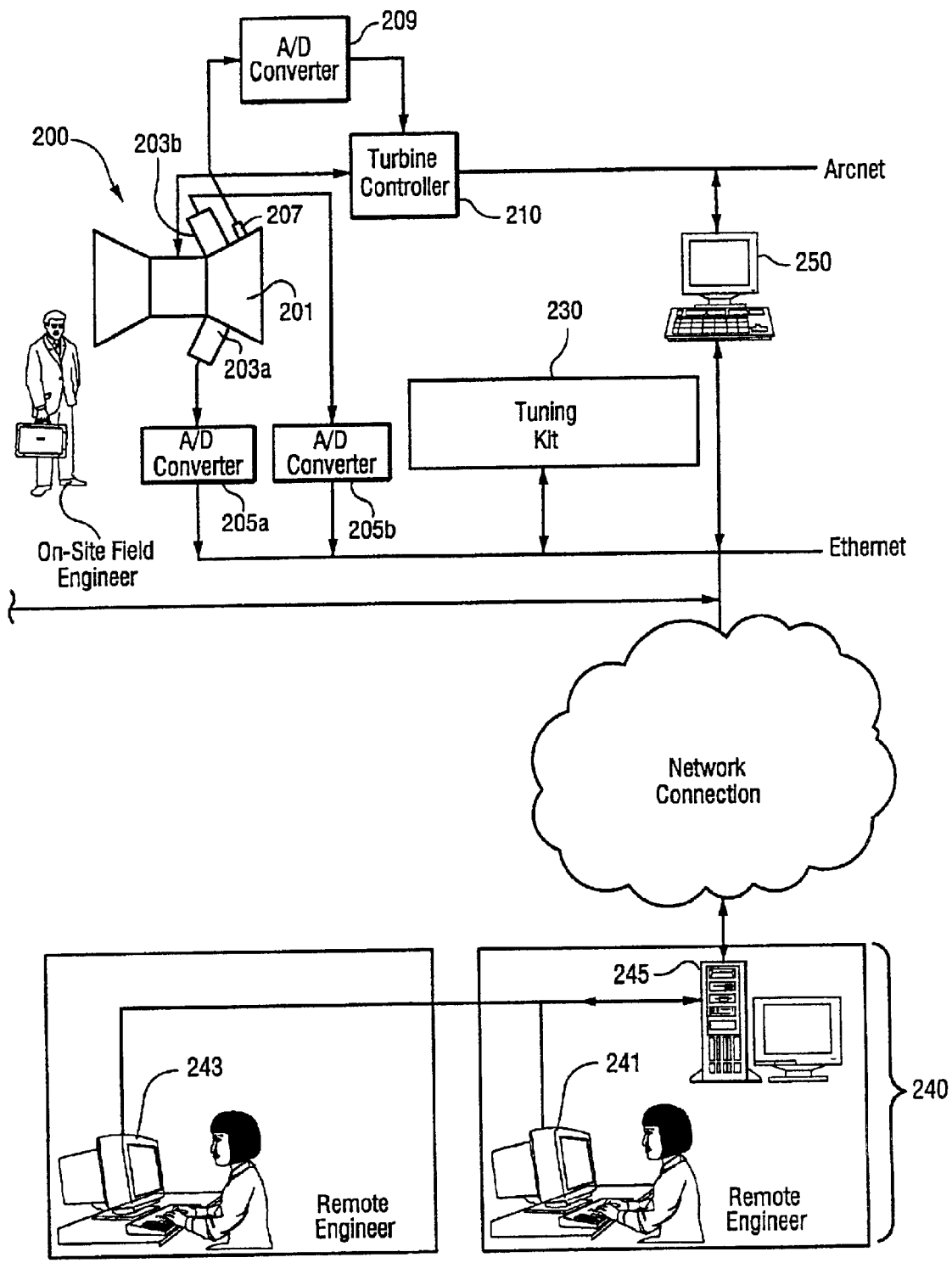

FIGS. 5A–5B illustrate multiple gas turbine systems that are each operatively connected to the LAN 240 in accordance with another exemplary embodiment of the present invention. The turbine systems are located remotely from each other and are both located remotely from the LAN 240. For example, each of the gas turbine systems and the LAN 240 can be located in different cities.

The first turbine system includes turbine 200 and all of the other components discussed in the embodiment of FIG. 2. The second gas turbine system includes a gas turbine 300 having a plurality of combustion chambers 301, a plurality of pressure transducers 303a, 303b respectively installed in the combustion chambers 301, emissions sensors 307 (one shown) respectively installed in the combustion chambers 301 and a fuel manifold (not shown). The second gas turbine system further includes A/D converters 305a, 305b, 309, a tuning kit 330, an OSM 350 and a turbine controller 310. The pressure transducers 303a, 303b and emissions sensors 307 measure the pressure and emissions of the turbine 301, respectively, in a manner similar to pressure transducers 203a, 203b and emission sensors 207. The raw data from the measurements of the pressure transducers 303a, 303b and emissions sensors 307 are processed and output by the A/D converters 305a, 305b, 309 to the tuning kit 330 and the turbine controller 310 and later transmitted by OSM 350 in a manner similar to corresponding parts (A/D converters 205a, 205b, 209, turbine controller 210, tuning kit 230 and OSM 250) of the first turbine system. Accordingly, the OSMs 250, 350 are both capable of exchanging data with LAN 240 over the network connection to tune turbines 200, 300, respectively. The system user at one of the workstations 241, 243 can thus tune each of the turbines 200, 300 from a single location remote from both of the turbines 200, 300. The engineer thus does not need to unnecessarily travel between the locations of the turbines 200, 300 and therefore can tune turbines 200, 300 with enhanced efficiency.

The exemplary embodiment disclosed in FIGS. 5A and 5B can be modified in accordance with the embodiment of FIG. 3. That is, after the system user at one of the workstations 241, 243 evaluates data that has been transmitted over the network connection relating to the measurements performed at the turbines 200, 300, the system user can communicate any necessary changes, (e.g., by telephone) to respective on-site engineers at the locations of the turbines 200, 300 for local tuning. Thus, no control data needs to be transmitted back from the LAN 240 to the OSMs 250, 350 over the network connection to tune turbines 200, 300.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for tuning a gas turbine comprising:

a turbine controller operatively coupled to the gas turbine;

a first computer system operatively coupled to the turbine controller and located locally to the gas turbine; and a second computer system for exchanging data with the first computer system, the second computer system being located remotely from the gas turbine;

wherein the first computer system is capable of transmitting data relating to combustion dynamics and/or emissions of the gas turbine to the second computer system, and the second computer system is capable of receiving user input in response to the data transmitted from the first computer system and transmitting control data reflecting the received user input to the first computer system to enable the turbine controller to tune fuel split settings of the gas turbine.

2. The system of claim 1 wherein the first computer system and the second computer system exchange data over a network connection.

3. The system of claim 2 wherein the network connection comprises an intranet, an internet or a virtual private network.

4. The system of claim 2 wherein the first computer system comprises an on-site monitor and the second computer system comprises a local area network having a workstation, the first computer system being capable of exchanging data with the workstation via the on-site monitor.

5. The system of claim 4 wherein the on-site monitor exchanges data with the turbine controller using a first protocol and the on-site monitor exchanges data with the second computer system using a second protocol different than the first protocol.

6. A method of tuning a gas turbine comprising:

providing a turbine controller that is operatively coupled to the gas turbine;

operatively coupling a first computer system to the turbine controller and locating the first computer system locally to the turbine;

transmitting data relating to combustion dynamics and/or emissions of the gas turbine from the first computer system to a second computer system that is located remotely from the gas turbine;

transmitting control data from the second computer system to the first computer system, the control data reflecting user input to the second computer system; and processing the control data received by the first computer system to enable the turbine controller to tune fuel split settings of the gas turbine.

7. The method of claim 6 wherein exchanging data between the first computer system and the second computer system is accomplished over a network connection.

8. The method of claim 7 wherein the network connection comprises an intranet, an internet or a virtual private network.

9. The method of claim 7 wherein the first computer system exchanges data with the turbine controller using a first protocol and exchanges data with the second computer system using a second protocol different than the first protocol.

10. A system comprising:

a first gas turbine;

a first turbine controller operatively coupled to the first gas turbine; and a first computer system operatively coupled to the first turbine controller for transmitting data relating to combustion dynamics and/or emissions of the first gas turbine to a remote location over a network connection, and processing control data received over the network connection in response to the transmitted data relating to the combustion dynamics and/or emissions of the first gas turbine and processing the control data to enable the first turbine controller to tune fuel split settings of the first gas turbine.

11. The system of claim 10 further comprising a second computer system located at the remote location from the gas turbine for receiving data transmitted from the first computer system over the network connection.

12. The system of claim 11 wherein the network connection comprises an intranet, an internet or a virtual private network.

13. The system of claim 10 further comprising a second gas turbine and a second turbine controller operatively coupled to the second gas turbine and to the first computer system.

14. A method of tuning at least one gas turbine utilizing a first computer system comprising:

providing a first gas turbine;

operatively coupling a first turbine controller to the first turbine;

transmitting data relating to combustion dynamics and/or emissions of the first gas turbine to a location remote from the first turbine over a network connection;

receiving control data over the network connection in response to the transmitted data relating to the combustion dynamics and/or emissions of the gas turbine; and processing the received control data to enable the first gas turbine controller to tune fuel split settings of the first gas turbine.

15. The method of claim 14, wherein transmitting the data to the location remote from the first gas turbine comprises transmitting the data to a second computer system located remotely from the first gas turbine.

16. The method of claim 15, further comprising:

receiving the transmitted data relating to combustion dynamics and/or emissions of the first gas turbine at the second computer system;

evaluating the processed data to determine any changes that need to be made to an operation of the first gas turbine;

communicating any necessary changes to a person located on-site of the first gas turbine; and changing a setting of the first gas turbine in accordance with the necessary changes communicated to the person on-site of the first gas turbine.

17. The method of claim 15 wherein transmitting the data over the network connection comprises transmitting data over one of an intranet, an internet and a virtual private network.

18. The method of claim 14 further comprising:

providing a second gas turbine;

operatively coupling a second turbine controller to the second gas turbine; and transmitting data relating to combustion dynamics and/or emissions of the second gas turbine to the location remote from the first gas turbine over the network connection, the location remote from the first gas turbine also being remote from the second gas turbine.

19. A system comprising:

a first gas turbine;

a first turbine controller operatively coupled to the first gas turbine;

a first computer system operatively coupled to the first turbine controller and located locally to the first gas turbine;

a second gas turbine;

a second turbine controller operatively coupled to the second gas turbine;

a second computer system operatively coupled to the second turbine controller and located locally to the second gas turbine;

a third computer system for exchanging data with the first computer system and the second computer system, the third computer system being located remotely from the first and second gas turbines;

wherein the first computer system transmits data relating to combustion dynamics and/or emissions of the first gas turbine to the third computer system and the second computer system transmits data relating to combustion dynamics and/or emissions of the second gas turbine to the third computer system; and the third computer system receives user input and transmits control data to the first computer system and the second computer system corresponding to the received user input, and the first computer system processes the control, data to enable the first turbine controller to tune fuel split settings of the first gas turbine and the second computer system processes the control data to enable the second turbine controller to tune fuel split settings of the second gas turbine.

20. The system of claim 19 wherein the first and second gas turbines are located remotely from each other.

21. The system of claim 19 wherein the third computer system exchanges data with the first computer system and the second computer system via a network connection.

22. The system of claim 21 wherein the network connection comprises an intranet, an internet or a virtual private network.

* * * * *